United States Patent
Senft et al.

[15] 3,670,592
[45] June 20, 1972

[54] STEERING INSTALLATION, ESPECIALLY FOR COMMERCIAL-TYPE VEHICLES

[72] Inventors: Herbert Senft, Gaggenau (Murgtal); Hans Rinnergschwentner, Rotenfels (Murgtal), both of Germany

[73] Assignee: Daimler-Benz Aktiengesellschaft, Stuttgart-Unterturkheim, Germany

[22] Filed: Aug. 7, 1970

[21] Appl. No.: 62,040

[30] Foreign Application Priority Data

Aug. 8, 1969 Germany.....................P 19 40 493.4

[52] U.S. Cl. ..........................................74/493, 74/473 SW
[51] Int. Cl. ........................................................B62d 1/18
[58] Field of Search..............74/493, 492, 473 SW; 180/78; 280/87 A

[56] References Cited

UNITED STATES PATENTS

| | | | |
|---|---|---|---|
| 3,342,080 | 9/1967 | Cantleberry | 74/493 |
| 2,987,936 | 6/1961 | Selle et al. | 74/493 |
| 3,362,247 | 1/1968 | Watts | 74/493 |
| 3,386,309 | 6/1968 | Reed et al. | 74/493 |
| 3,396,600 | 8/1968 | Zeigler et al. | 74/493 |

*Primary Examiner*—William F. O'Dea
*Assistant Examiner*—F. D. Shoemaker
*Attorney*—Craig, Antonelli & Hill

[57] ABSTRACT

A steering installation for motor vehicles, particularly trucks, which essentially includes a steering spindle, a steering column, a vertically adjustable steering wheel, and vehicle operating and actuating devices, such as gear shift levers etc., coordinated to the steering wheel. The operating and actuating devices are so connected with the steering spindle that they have substantially the same distance to the steering wheel in every position of the latter. A connecting support provided for the operating and actuating devices is secured at the steering spindle so that these devices may move axially with the steering spindle but are prevented from rotating with the steering spindle during normal turning operations. The steering column is fixed in position and surrounds the steering spindle. The connecting support extends through a groove in said column, which groove holds the connecting support against rotation with the steering spindle. The steering column may also be pivotal for further adjustment possibilities.

10 Claims, 2 Drawing Figures

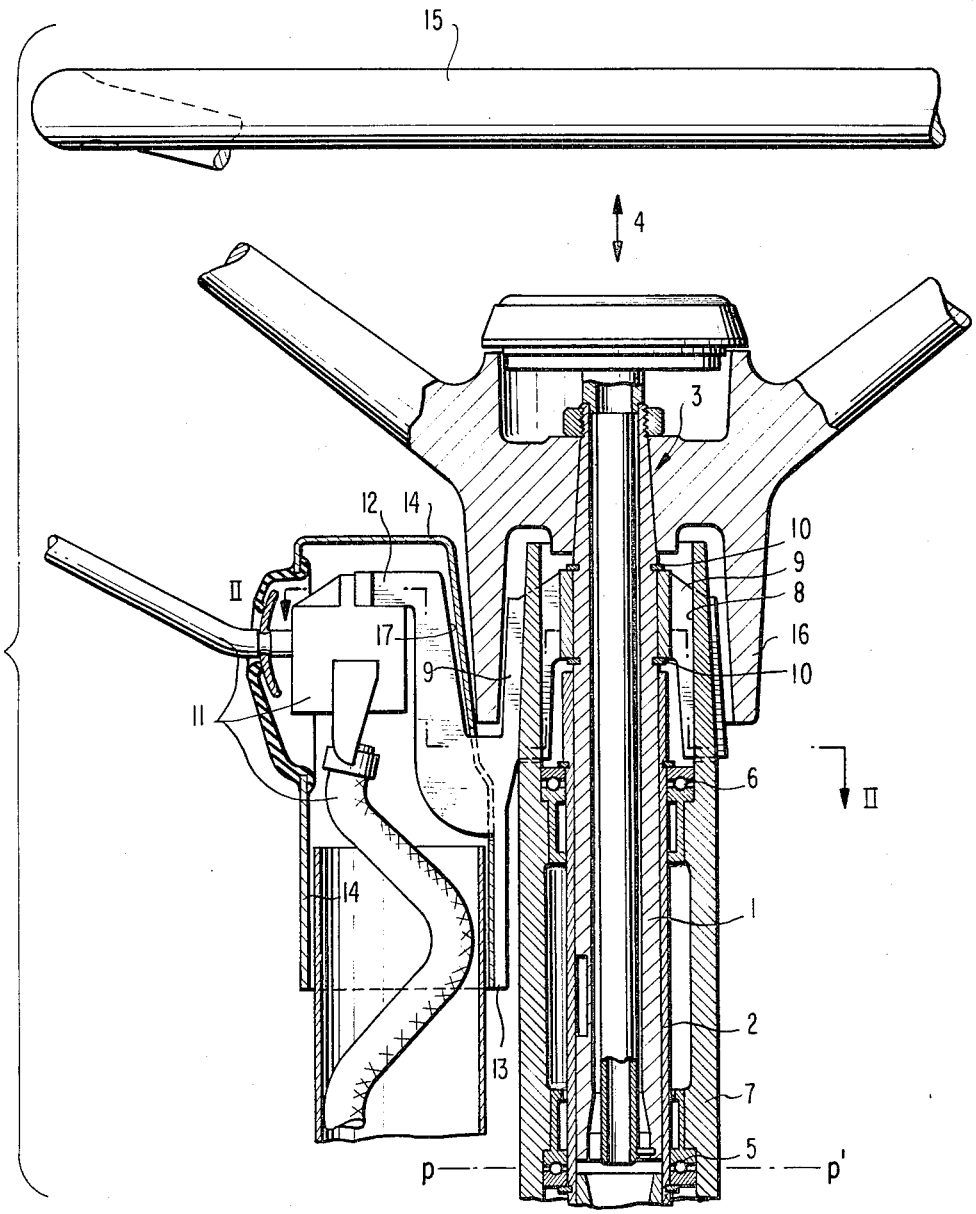
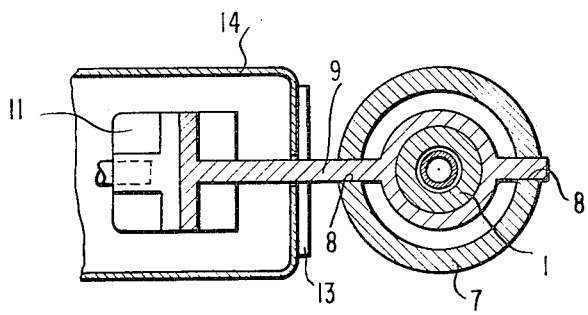
FIG. 1
FIG. 2
INVENTORS
HERBERT SENFT
HANS RINNERGSCHWENTNER

STEERING INSTALLATION, ESPECIALLY FOR COMMERCIAL-TYPE VEHICLES

The present invention relates to a steering installation for motor vehicles, especially for commercial-types of vehicles, which essentially consists of a steering spindle, of a steering column, of a steering wheel and of operating and actuating installations associated with the steering wheel, in which the steering wheel is adjustable in its height position and the steering column is constructed pivotal.

Known already in connection with motor vehicles are arrangements of steering installations adjustable in the locations thereof, in which the steering column is pivotally supported. It is also known to mount a structural group, including vehicle operating, actuating and indicating apparatus, for movement in the transverse direction of the motor vehicle together with the steering column. However, with these last mentioned arrangements a height adjustment of the steering installation in the axial direction is not possible.

The present invention is concerned with the task to eliminate this disadvantage, present in particular with commercial types of vehicles, and to take measures that enable a simple and relatively inexpensive installation.

The underlying problems are solved according to the present invention in that the operating and actuating devices are so connected with the steering spindle that these devices have the same distance to the steering wheel in each position of the steering wheel or the steering spindle, and that a connecting support provided for the operating and actuating devices is secured in the axial direction at the steering spindle and is held against rotation with the steering spindle.

On the basis of the present invention, the connecting support may engage in a groove disposed along a diameter of a steering column surrounding the steering spindle, which arrangement precludes a movement of the operating and actuating devices in the circumferential direction during the turning of the vehicle.

According to the present invention, the connecting support may be provided with a cut-out for the lower portion of a steering wheel hub and may be provided with a support arm carrying the operating and actuating installation.

In an advantageous construction of the present invention, the connecting support may be provided below the support arm with an elongated extension at which is secured a cover for partially covering the operating and actuating installation.

Accordingly, it is an object of the present invention to provide a steering installation, especially for trucks, which avoids by simple means the aforementioned shortcomings and drawbacks encountered in the prior art.

Another object of the present invention resides in a steering installation, especially for trucks or the like which permits both an adjustment of the steering wheel in the axial direction of the steering spindle as well as a pivotal movement thereof.

A further object of the present invention resides in a steering installation of the aforementioned type which is simple in construction and requires relatively few parts involving low expenditures.

These and other objects, features and advantages of the present invention will become more obvious from the following description when taken in connection with the accompanying drawing which shows, for purposes of illustration only, one embodiment in accordance with the present invention, and wherein:

FIG. 1 is a partial longitudinal cross-sectional view through a steering installation in accordance with the present invention; and FIG. 2 is a partial transverse cross-sectional view through the upper steering column taken along line II—II of FIG. 1.

Referring now to the drawing wherein like reference numerals are used throughout the two views to designate like parts, the steering installation according to FIG. 1 is provided with a steering spindle generally designated by reference numeral 3 and consisting of two steering spindle tubes 1 and 2. The steering spindle 3 is adjustable at will in the direction of arrows 4, whereby the steering spindle tube 1 slides on the inside of the steering spindle tube 2 that is fixed in the axial direction but is rotatable in the circumferential direction. The steering spindle tube 2 is supported by means of two bearings 5 and 6 in a steering column 7 surrounding the steering spindle 3. The steering column 7, which is immovable in the circumferential as well as in the axial direction, is provided at one end according to FIGS. 1 and 2 with two grooves 8 disposed along a diameter. A connecting support 9 engages into these grooves 8. This support 9 is supported on the steering spindle 3 and is secured in the axial direction by two retaining rings 10 so that the connecting support 9 can be displaced together with the steering spindle 3 in the arrow direction 4. During this operation, the connecting support 9, carrying several operating and actuating devices 11 and provided with a support arm 12, is displaced in the grooves 8 of the steering column 7 whereby a rotary movement of the connecting support 9 is made possible in the circumferential direction. Below the connecting support 9 is provided an elongated extension 13 which is provided for the mounting support of a cover 14 partially covering the aforementioned devices 11. A steering wheel 15 is secured at the conically tapering end of the steering spindle tube 1 and projects with the lower part of its steering wheel hub 16 into a cut-out or recess 17 of the connecting support 9 provided therefor.

During an adjustment of the steering wheel 15 in the axial direction, the distance between the steering wheel 15 and the operating and actuating installations 11 is not changed.

If the steering wheel 15 together with the steering spindle 3 is rotated in the circumferential direction, then the operating and actuating installations 11 coordinated to the connecting support 9 do not carry out any rotary movement by reason of the particular design and construction of the steering column.

The steering column 7 may be mounted for pivotal movement about a transverse axis, as schematically indicated by p–p' in the drawings, to provide further adjustment possibilities.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A steering installation for commercial motor vehicles comprising: a steering wheel which is adjustable in height, a steering spindle operatively connected to said steering wheel for axial and rotatable movement therewith, a steering column surrounding portions of said spindle, vehicle operating and actuating means coordinated to the steering wheel, and support means for operatively supporting the operating and actuating means with respect to the steering wheel and steering spindle, said support means being secured at the spindle for axial movement with said spindle such that the operating and actuating means have the same distance to the steering wheel in every adjusted position thereof, said support means being non-rotatably secured within said steering column whereby rotation of said operating and actuating means during rotation of the spindle is precluded.

2. A steering installation according to claim 1, characterized in that the steering column is pivotally connected to the vehicle structure.

3. A steering installation according to claim 1, characterized in that the support means engages in grooves of the steering column surrounding the steering spindle, said grooves being disposed substantially along a diametric dimension of the steering column.

4. A steering installation according to claim 3, characterized in that the support means is provided with a recessed portion for the lower part of a steering wheel hub and includes a support arm carrying the operating and actuating means.

5. A steering installation according to claim 4, characterized in that the support means includes below the support arm an extended projection at which is secured a cover partially covering the operating and actuating means.

6. A steering installation according to claim 5, characterized in that the steering column is pivotally connected to the vehicle structure.

7. A steering installation according to claim 1, characterized in that the support means is provided with a recessed portion for the lower part of a steering wheel hub and includes a support arm carrying the operating and actuating means.

8. A steering installation according to claim 7, characterized in that the support means includes below the support arm an extended projection at which is secured a cover partially covering the operating and actuating means.

9. A steering installation according to claim 1, characterized in that the support means includes an extended projection at which is secured a cover partially covering the operating and actuating means.

10. A steering installation according to claim 1, characterized in that said support means is non-rotatably held within said steering column by way of grooves provided in said steering column.

* * * * *